US011558286B2

(12) United States Patent
 Vastholil et al.

(10) Patent No.: US 11,558,286 B2
(45) Date of Patent: *Jan. 17, 2023

(54) WIRELESS CONTROL AND FABRIC LINKS FOR HIGH-AVAILABILITY CLUSTER NODES

(71) Applicant: Juniper Networks, Inc., Sunnyvale, CA (US)

(72) Inventors: Ashok Babu Vastholil, Bangalore (IN); Vinayaraju B, Bangalore (IN); Sasikumar Sekar, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 88 days.

This patent is subject to a terminal disclaimer.

(21) Appl. No.: 17/302,091

(22) Filed: Apr. 23, 2021

(65) Prior Publication Data

US 2021/0243115 A1   Aug. 5, 2021

Related U.S. Application Data

(63) Continuation of application No. 16/440,723, filed on Jun. 13, 2019, now Pat. No. 10,999,187.

(51) Int. Cl.
*H04L 45/28* (2022.01)
*H04W 76/10* (2018.01)
*H04L 49/55* (2022.01)
*H04L 49/253* (2022.01)
*H04W 8/30* (2009.01)

(52) U.S. Cl.
CPC ............ *H04L 45/28* (2013.01); *H04W 76/10* (2018.02); *H04L 49/253* (2013.01); *H04L 49/557* (2013.01); *H04W 8/30* (2013.01)

(58) Field of Classification Search
CPC ..... H04L 45/28; H04L 49/253; H04L 49/557; H04L 2012/5627; H04W 8/30; H04W 76/10
See application file for complete search history.

(56) References Cited

U.S. PATENT DOCUMENTS

| 4,862,461 A | 8/1989 | Blaner |
|---|---|---|
| 8,948,004 B2 | 2/2015 | Kamath et al. |
| 10,999,187 B2 | 5/2021 | Vastholil et al. |

(Continued)

FOREIGN PATENT DOCUMENTS

| CN | 102437961 A | 5/2012 |
|---|---|---|
| CN | 107071189 A | 8/2017 |

OTHER PUBLICATIONS

Extended European Search Report for Application No. EP19217994.3, dated Mar. 6, 2020, 12 pages.

(Continued)

*Primary Examiner* — Warner Wong
(74) *Attorney, Agent, or Firm* — Harrity & Harrity, LLP

(57) ABSTRACT

A first network device in a high-availability cluster may configure a first wireless channel for a wireless control link. The first network device may establish, using the first wireless channel, the wireless control link with a second network device in the high-availability cluster. The first network device may configure a second wireless channel for a wireless fabric link. The first network device may establish, using the second wireless channel, the wireless fabric link with the second network device.

20 Claims, 11 Drawing Sheets

(56) References Cited

U.S. PATENT DOCUMENTS

| | | | |
|---|---|---|---|
| 2003/0219253 A1* | 11/2003 | Kukshya | H04B 10/1121 |
| | | | 398/118 |
| 2004/0003111 A1 | 1/2004 | Maeda et al. | |
| 2005/0058147 A1 | 3/2005 | Regnier et al. | |
| 2005/0102559 A1 | 5/2005 | Hyytianen | |
| 2006/0146809 A1 | 7/2006 | Tsurumi et al. | |
| 2006/0153067 A1 | 7/2006 | Vasseur et al. | |
| 2008/0176561 A1* | 7/2008 | Shao | H04W 8/005 |
| | | | 455/434 |
| 2010/0046434 A1 | 2/2010 | Weniger et al. | |
| 2010/0238855 A1 | 9/2010 | Yoshida et al. | |
| 2012/0329448 A1* | 12/2012 | Lim | H04W 92/20 |
| | | | 455/422.1 |
| 2013/0103749 A1 | 4/2013 | Werth et al. | |
| 2013/0121263 A1 | 5/2013 | Nguyen et al. | |
| 2014/0229695 A1 | 8/2014 | Dinkar et al. | |
| 2014/0380497 A1* | 12/2014 | Sotos | H04W 12/50 |
| | | | 726/26 |
| 2016/0056931 A1* | 2/2016 | Fan | H04L 5/0035 |
| | | | 370/329 |
| 2016/0165463 A1 | 6/2016 | Zhang | |
| 2017/0048136 A1 | 2/2017 | Williams | |
| 2018/0014345 A1* | 1/2018 | Sartori | H04W 76/14 |
| 2019/0190641 A1* | 6/2019 | Wang | H04L 1/0001 |
| 2019/0230067 A1 | 7/2019 | Lal et al. | |
| 2021/0211858 A1* | 7/2021 | Ellenbeck | H04W 72/0466 |

OTHER PUBLICATIONS

Wang J.C-P., et al., "Routing Instability in Ad Hoc Networks", Jun. 2010, 28, XP055668941, 185 pages [retrieved on Feb. 17, 2020] Retrieved from the internet [URL: https://ro.uow.edu.au/theses/2707/].

* cited by examiner

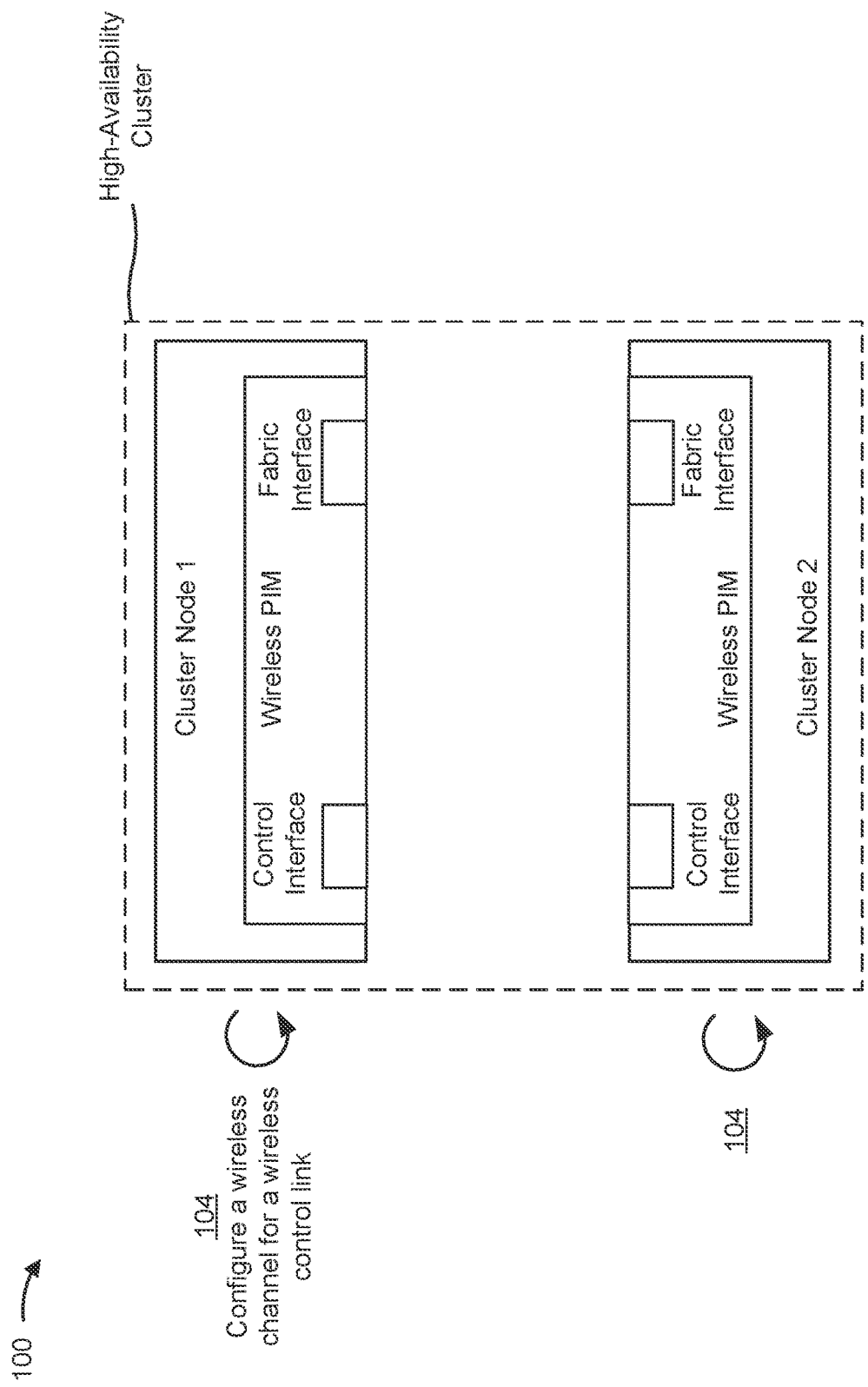

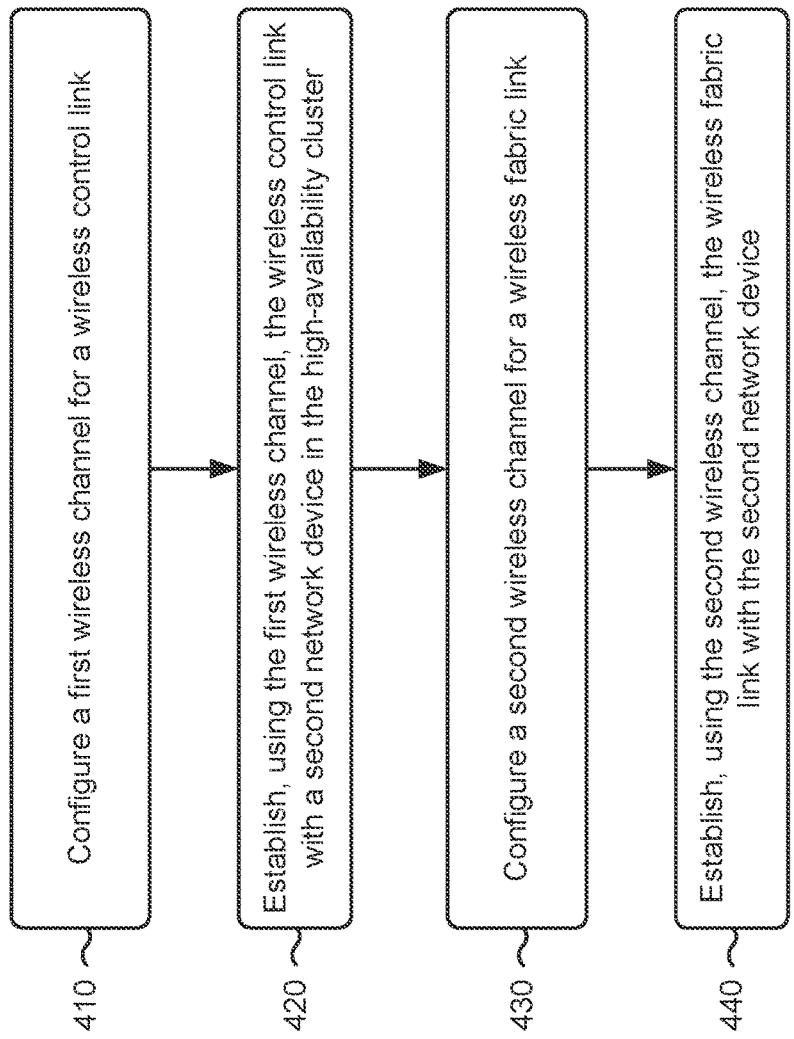

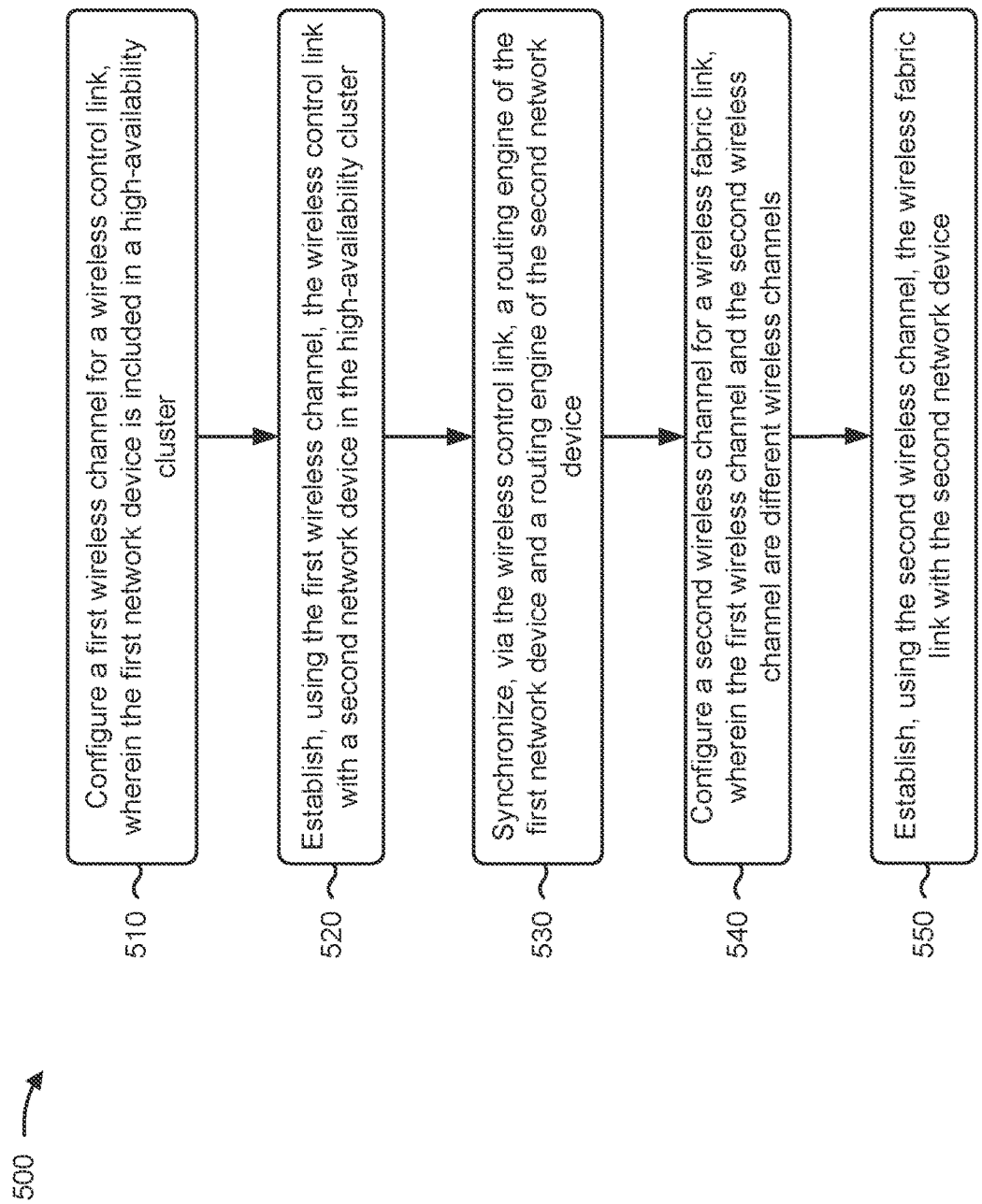

WIRELESS CONTROL AND FABRIC LINKS FOR HIGH-AVAILABILITY CLUSTER NODES

RELATED APPLICATION

This application is a continuation of U.S. patent application Ser. No. 16/440,723, filed Jun. 13, 2019 (now U.S. Pat. No. 10,999,187), which is incorporated herein by reference in its entirety.

BACKGROUND

A high-availability cluster may include a plurality of network devices that are linked or connected together to form a logical or virtual network device that is more resilient to faults than if the plurality of network devices were to operate in discrete configurations. The plurality of network devices in the high-availability cluster may share session information associated with routing engine sessions and/or user sessions such that faults in the high-availability cluster may be mitigated by near instantaneous failover and/or reversion of stateful network traffic.

SUMMARY

According to some implementations, a method may include configuring, by a first network device in a high-availability cluster, a first wireless channel for a wireless control link; establishing, by the first network device and using the first wireless channel, the wireless control link with a second network device in the high-availability cluster; configuring, by the first network device, a second wireless channel for a wireless fabric link; and establishing, by the first network device and using the second wireless channel, the wireless fabric link with the second network device.

According to some implementations, a first network device may include one or more memories and one or more processors, to configure a first wireless channel for a wireless control link, wherein the first network device is included in a high-availability cluster; establish, using the first wireless channel, the wireless control link with a second network device in the high-availability cluster; synchronize, via the wireless control link, a routing engine of the first network device and a routing engine of the second network device; configure a second wireless channel for a wireless fabric link, wherein the first wireless channel and the second wireless channel are different wireless channels; and establish, using the second wireless channel, the wireless fabric link with the second network device.

According to some implementations, a system may include a first network device in a high-availability cluster, comprising a first wireless physical interface module (PIM); and a second network device in the high-availability cluster, comprising a second wireless PIM, wherein a first control interface of the first PIM and a second control interface of the second PIM are communicatively connected via a wireless control link, and wherein a first fabric interface of the first PIM and a second fabric interface of the second PIM are communicatively connected via a wireless fabric link.

BRIEF DESCRIPTION OF THE DRAWINGS

FIGS. 1A-1F are diagrams of one or more example implementations described herein.

FIGS. 4 and 5 are flow charts of example processes for configuring wireless control and fabric links for high-availability cluster nodes.

DETAILED DESCRIPTION

Figure 1A:
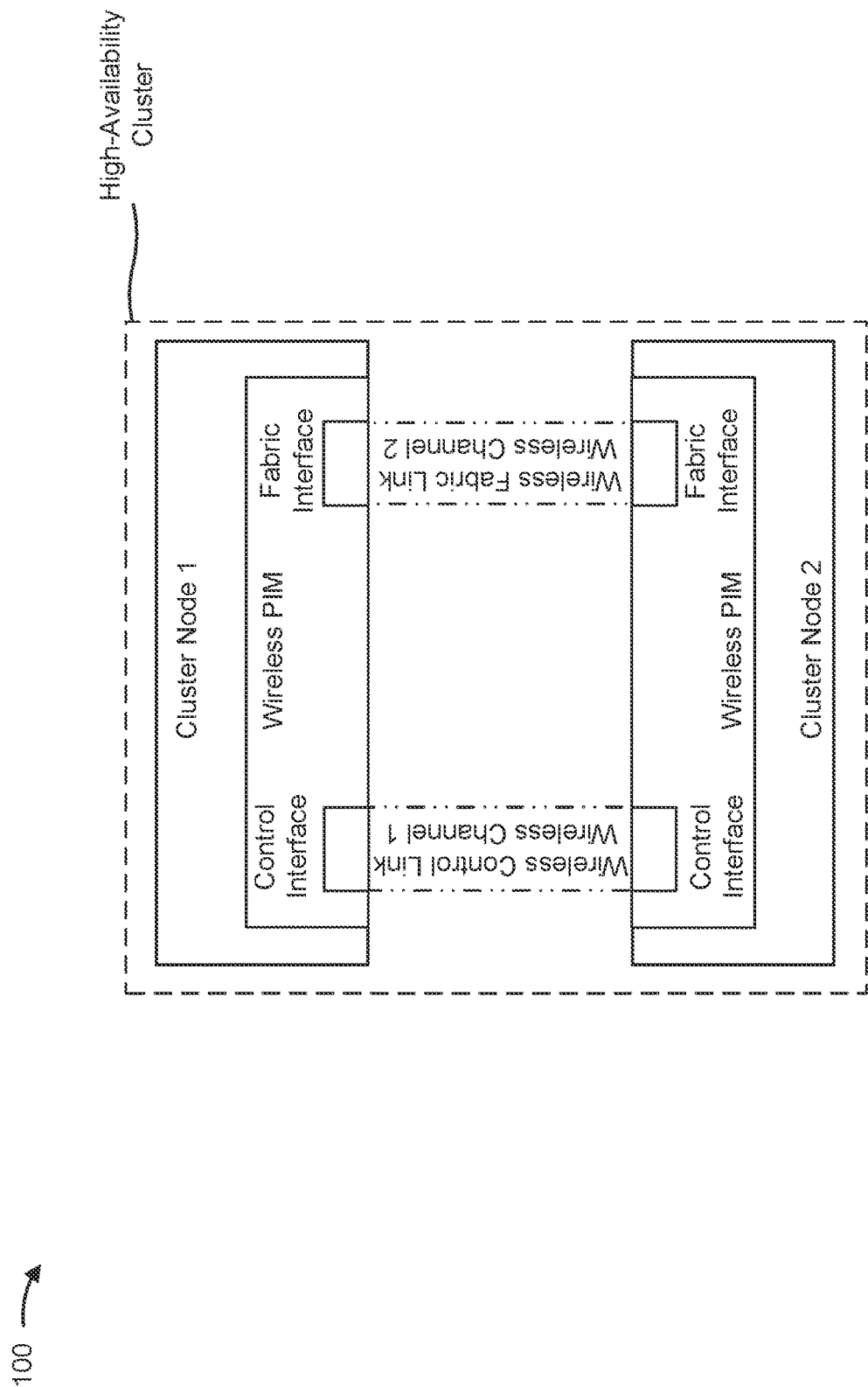

The following detailed description of example implementations refers to the accompanying drawings. The same reference numbers in different drawings may identify the same or similar elements.

To form a high-availability cluster, a plurality of network devices (which may be referred to as cluster nodes in the high-availability cluster) may be linked and/or connected via a plurality of interfaces. A control interface may provide a control link by which cluster nodes may exchange control traffic in order to synchronize routing engine sessions of the cluster nodes. A fabric interface may provide a fabric link by which cluster nodes may forward network traffic (e.g., traffic that is originated from and/or destined for client devices that are communicatively connected with the high-availability cluster).

In some cases, the control link and the fabric link may be implemented by physical network cables such as Ethernet cables, fiber cables, and/or the like. While physical network cables may provide high transfer rates and reliability, physical network cables increase the cost and complexity of deploying high-availability clusters, decrease the flexibility in deploying high-availability clusters (e.g., the physical network cables may limit the physical placement of cluster nodes in an office building), and/or the like.

Some implementations described herein provide network devices that are configured as high-availability cluster nodes with wireless control and fabric links. In some implementations, a network device (e.g., a high-availability cluster node) may include a wireless physical interface module (PIM), a wireless network interface controller (NIC), a wireless communication adapter, and/or another type of component that provides wireless communication capabilities. The network device may communicatively connect a wireless control interface with a wireless control interface of another network device in a high-availability cluster to establish a wireless control link, by which control traffic may be exchanged. Moreover, the network device may communicatively connect a wireless fabric interface with a wireless fabric interface of the other network device to establish a wireless fabric link, by which network traffic may be exchanged. In this way, the network devices in the high-availability cluster may be connected wirelessly, which decreases the cost and complexity of deploying the high-availability cluster. Moreover, the flexibility of deploying the high-availability cluster is increased in that the physical location of the network devices is not restricted due to running physical network cables. Accordingly, the network devices may be more optimally placed (e.g., in an office building, across a campus, and/or the like) such that the wireless coverage of the high-availability cluster, for client devices that communicatively connect with the high-availability cluster, may be increased.

FIGS. 1A-1F are diagrams of one or more example implementations 100 described herein. As shown in FIGS. 1A-1F, example implementation(s) 100 may include a plurality of network devices, such as cluster node 1, cluster node 2, and/or the like. In some implementations, example implementation(s) 100 may include a greater quantity of network devices and/or a greater quantity of high-availability clusters.

In some implementations, the plurality of network devices may be linked and/or connected together to form a high-availability cluster. In this case, the plurality of network devices may be linked and/or connected together to form a logical or virtual network device (which may be referred to as a chassis cluster) that is more resilient to faults than if the plurality of network devices were to operate in discrete configurations. The plurality of network devices in the high-availability cluster may share session information associated with routing engine sessions and/or user sessions such that faults in the high-availability cluster may be mitigated by near instantaneous failover and/or reversion of stateful network traffic. The high-availability cluster may be deployed in various settings, contexts, and/or locations, such as an office branch, a campus, a retail location, and/or the like.

As shown in FIG. 1A, cluster node 1 and cluster node 2 (as well as other cluster nodes in the high-availability cluster) may be linked and/or connected via a plurality of wireless links, such as a wireless control link, a wireless fabric link, and/or the like. Cluster node 1 and cluster node 2 may exchange control traffic (e.g., traffic that is originated and/or terminated in a control plane or routing engine) via the wireless control link and may forward network traffic (e.g., traffic that is to be forwarded by a data plane or forwarding engine of a cluster node) via the wireless fabric link.

Cluster node 1 and cluster node 2 may exchange control traffic via the wireless control link to form a unified control plane or routing engine for the high-availability cluster, to synchronize the configuration and kernel state of the control plane or routing engine to facilitate the high-availability of interfaces and services of the high-availability cluster, and/or the like. The control traffic may include, for example, routing engine session information, information identifying one or more routing tables (e.g., a routing information base (RIB), a forwarding information base (FIB), a label information base (LIB), a label forwarding instance base (LFIB), and/or the like) associated with the routing engine, routing protocol traffic (e.g., border gateway protocol (BGP) traffic, open shortest path first (OSPF) traffic, routing information protocol (RIP) traffic, intermediate system to intermediate system (IS-IS) protocol traffic, and/or the like), keep-alive or heartbeat packets (e.g., packets that may be used to determine whether a cluster node has become unresponsive and/or whether a failure or fault associated with a cluster node has occurred), and/or the like.

The wireless fabric link may permit cluster node 1 and cluster node 2 (and other cluster nodes in the high-availability cluster) to form a unified data plane or forwarding engine for the high-availability cluster. In this case, cluster node 1 and cluster node 2 may forward network traffic via the wireless fabric link (e.g., cluster node 1 may forward network traffic to cluster node 2 via the wireless fabric link and/or cluster node 2 may forward network traffic to cluster node 1 via the wireless fabric link). The network traffic (which also may be referred to as transit traffic) may include application traffic, web traffic, voice (e.g., voice over Internet protocol (VoIP)) traffic, and/or other types of traffic that originated and/or terminated at a client device and/or other devices that communicatively connect with the high-availability cluster.

In some implementations, each of cluster node 1 and cluster node 2 may include a wireless PIM (or a wireless NIC, a wireless communication adapter, and/or another type of component that provides wireless communication capabilities). The wireless control link may communicatively connect a wireless control interface of cluster node 1 (e.g., provided by the wireless PIM of cluster node 1) and a wireless control interface of cluster node 2 (e.g., provided by the wireless PIM of cluster node 2). The wireless fabric link may communicatively connect a wireless fabric interface of cluster node 1 (e.g., provided by the wireless PIM of cluster node 1) and a wireless fabric interface of cluster node 2 (e.g., provided by the wireless PIM of cluster node 2).

The wireless control link and wireless fabric link may be implemented over wireless channels. For example, the wireless control link may be implemented over wireless channel 1, and the wireless fabric link may be implemented over wireless channel 2. A wireless channel may include a particular channel frequency and an upper frequency bound and a lower frequency bound determined based on a channel width (e.g., 20 MHz, 40 MHz, etc.). For example, wireless channel 1 may have a channel frequency of 2.412 GHz and a channel width of 20 MHz, and therefore may have an upper frequency bound of 2.422 GHz and a lower frequency bound of 2.402 GHz. In some implementations, a channel frequency may be associated with various licensed and/or unlicensed radio frequency (RF) ranges, such as the 2.4 GHz RF range (e.g., between 2.4 GHz and 2.5 GHz), the 5 GHz RF range (e.g., between 4.9 GHz and 6 GHz), the 60 GHz RF range (e.g., between 57 GHz and 64 GHz), and/or the like. In some implementations, a channel frequency may be unassociated with an RF range and/or with any defined communication protocol channel.

In some implementations, wireless channel 1 and wireless channel 2 may be the same wireless channel or different wireless channels, may be non-overlapping wireless channels, may be half-duplex wireless channels or full-duplex wireless channels, and/or the like. In some implementations, wireless channel 1 may be different from and/or non-overlapping with the wireless channels that cluster node 1 uses for wireless communication links with client devices. In some implementations, wireless channel 2 may be different from and/or non-overlapping with the wireless channels that cluster node 2 uses for wireless communication links with client devices. In some implementations, wireless channel 1 and wireless channel 2 may be different from and/or non-overlapping with the wireless channels that cluster node 1 and cluster node 2 use for wireless communication links with client devices.

Figure 1B:
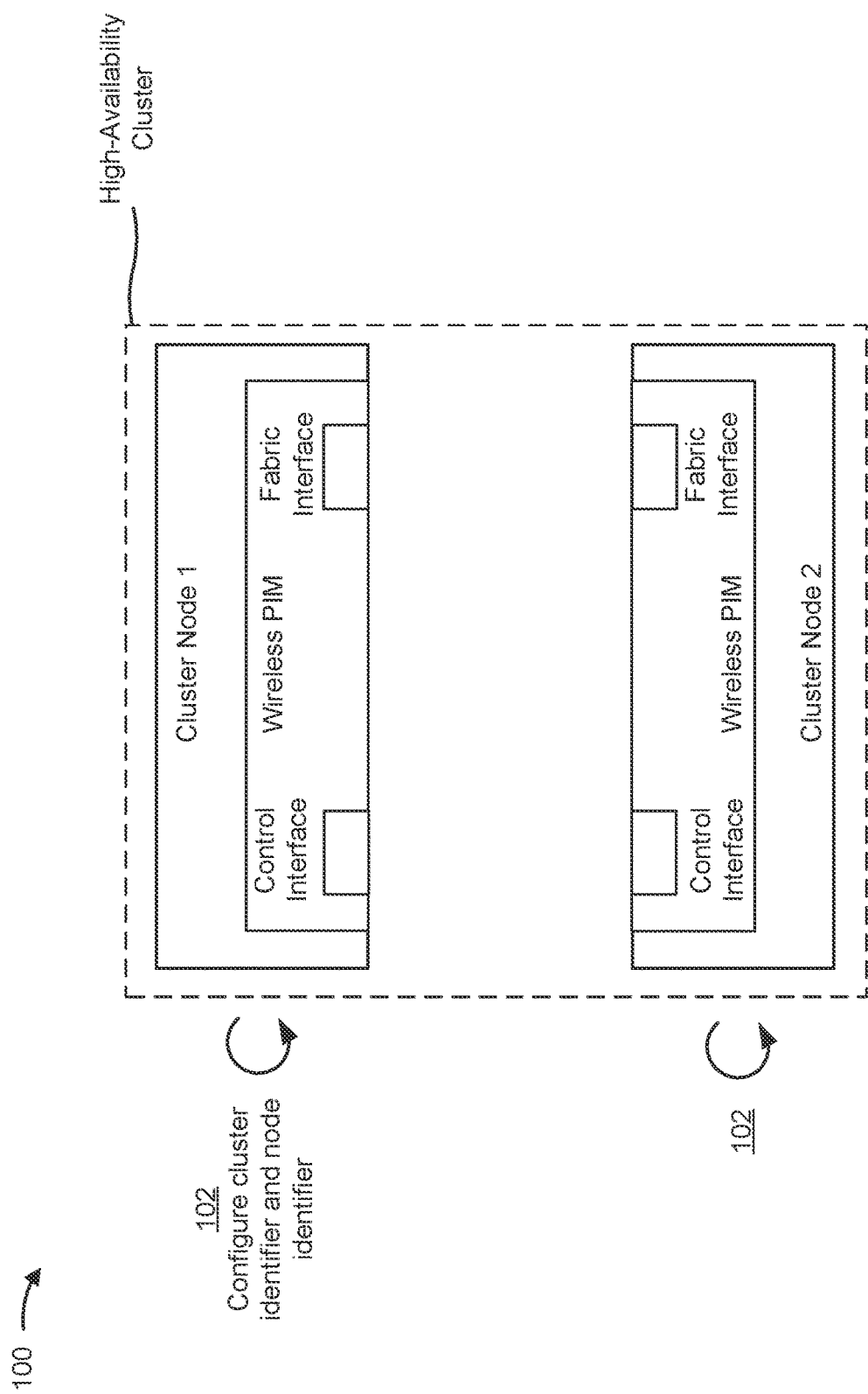

As shown in FIGS. 1B-1F, cluster node 1 and cluster node 2 (and other cluster nodes) may perform a process to form and/or establish the high-availability cluster, to add and/or remove cluster nodes from the high-availability cluster, and/or the like. As shown in FIG. 1B, and by reference number 102, each cluster node may configure a cluster identifier and a node identifier. The cluster identifier may be associated with the high-availability cluster and may identify the high-availability cluster from other high-availability clusters. In this case, cluster node 1 and cluster node 2 may be configured with the same cluster identifier such that cluster node 1 and cluster node 2 are to be included in the same high-availability cluster. The cluster identifier may include a name, a numeric value, an alpha-numeric string, and/or the like.

The node identifier may be associated with and specific to a cluster node such that the node identifier may identify the cluster node from other cluster nodes in the same high-availability cluster. In this case, cluster node 1 and cluster node 2 may be configured with different node identifiers. The node identifier may include a name, a numeric value, an alpha-numeric string, and/or the like.

In some implementations, a cluster node (e.g., cluster node 1, cluster node 2, and/or the like) may configure a cluster identifier and node identifier for the cluster node based on receiving an instruction (e.g., a chassis cluster command and/or another type of instruction), which may be provided as input to the cluster node (e.g., by a user via a console port and/or another means for input to the cluster node). In some implementations, a cluster node may automatically configure a cluster identifier and node identifier for the cluster node based on an event, such as a reboot or restart of the cluster node and/or the like.

As shown in FIG. 1C, and by reference number 104, cluster node 1 and cluster node 2 may configure a wireless channel for a wireless control link between cluster node 1 and cluster node 2. In some implementations, cluster node 1 and cluster node 2 may automatically and jointly configure the wireless channel for the wireless control link between cluster node 1 and cluster node 2. In some implementations, cluster node 1 and cluster node 2 may configure the wireless channel for a wireless control link based on receiving an instruction, which may be provided as input (e.g., by a user via a console port and/or another means for input).

To automatically and jointly configure the wireless channel for the wireless control link, cluster node 1 may broadcast a signal or communication that indicates the cluster identifier and node identifier configured for cluster node 1. Cluster node 2 may broadcast a signal or communication that indicates the cluster identifier and node identifier configured for cluster node 2. Cluster node 1 may search or scan for cluster nodes that have been configured with the same cluster identifier as cluster node 1. Similarly, cluster node 2 may search or scan for cluster nodes that have been configured with the same cluster identifier as cluster node 2. In this case, cluster node 1 and cluster node 2 may identify each other and, accordingly, may jointly configure the wireless channel for the wireless control link based on determining that cluster node 1 and cluster node 2 are configured with the same cluster identifier. Cluster node 1 and cluster node 2 may jointly configure the wireless channel such that the respective wireless control interfaces of cluster node 1 and cluster node 2 are operating on the same wireless channel. In some implementations, cluster node 1 and cluster node 2 may reboot or restart after the wireless channel for the wireless control link is configured.

Figure 1D:
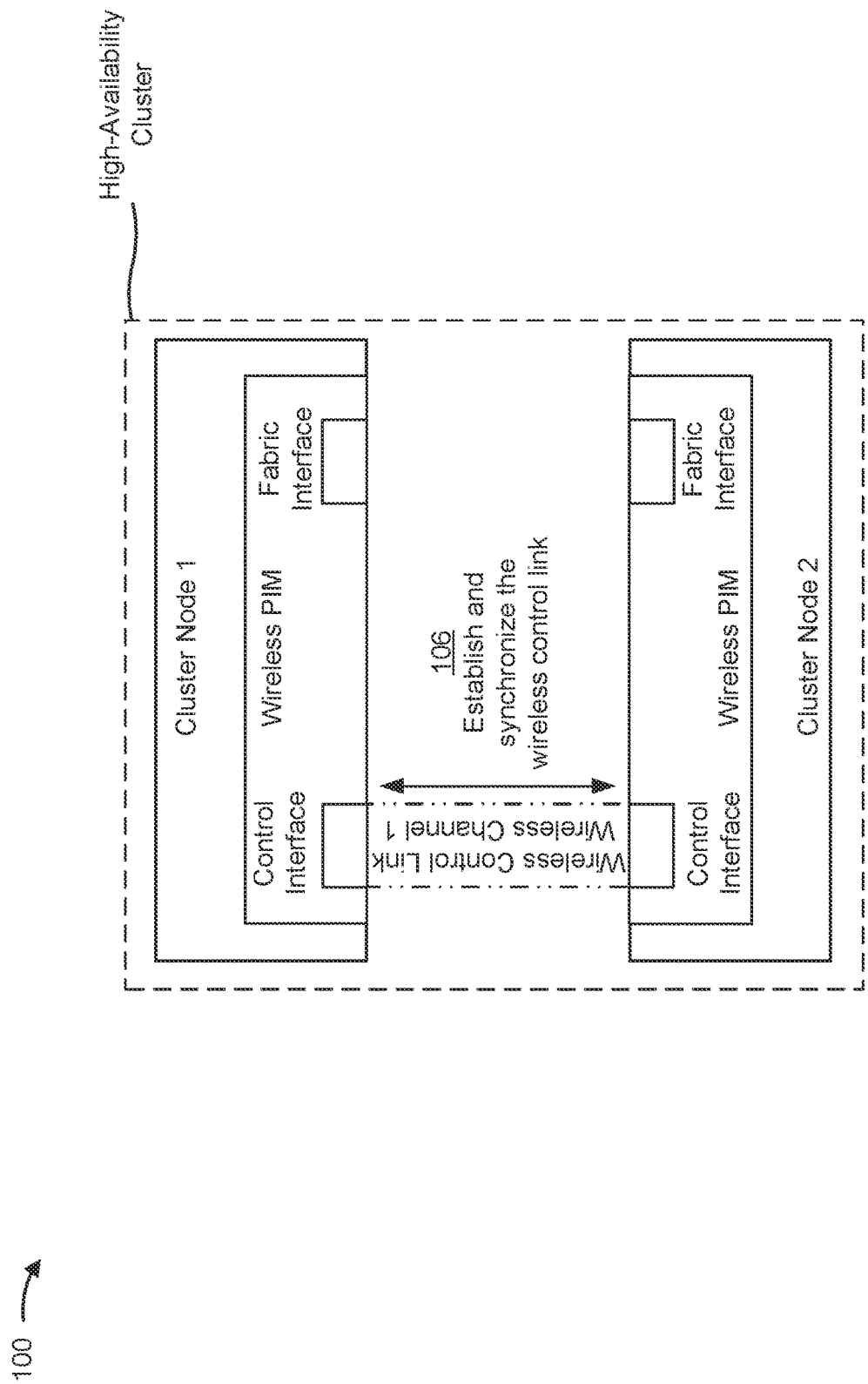

As shown in FIG. 1D, and by reference number 106, cluster node 1 and cluster node 2 may establish (e.g., after rebooting or restarting) the wireless control link over the wireless channel (e.g., wireless channel 1) configured for the wireless control link. To establish the wireless control link, cluster node 1 and cluster node 2 may perform a handshake process and/or another type of wireless connection establishment process. The handshake process may include a four-way handshake process (e.g., a four-way handshake according to IEEE 802.11i) and/or another type of handshake process. Moreover, to increase the network security over the wireless control link, cluster node 1 and cluster node 2 may establish a tunnel over the wireless control link such that control traffic may be securely transmitted via the wireless control link. The tunnel may include an Internet protocol security (IPSec) tunnel and/or another type of tunnel in which packets of the control traffic are encrypted, authenticated, and/or encapsulated.

Cluster node 1 and cluster node 2 may synchronize the wireless control link to synchronize the respective routing engines of cluster node 1 and cluster node 2 such that the respective routing engines operate as a unified routing engine for the high-availability cluster. To synchronize the wireless control link (and the unified control plane or routing engine of the high-availability cluster), cluster node 1 and cluster node 2 may exchange control traffic via the wireless control link. In this case, cluster node 1 and cluster node 2 may exchange routing engine session information, routing tables, routing protocol traffic, keep-alive or heartbeat packets, and/or the like.

In some implementations, as part of the synchronization process, cluster node 1 and cluster node 2 may jointly establish a primary node and a secondary node (or secondary nodes) of the high-availability cluster. The primary node of the high-availability cluster may host and maintain the user sessions of the client devices communicatively connected with the high-availability cluster, may host and maintain the primary routing engine session for the high-availability cluster, and/or the like. The secondary node of the high-availability cluster may host and maintain backup information for the user sessions and routing engine session for the high-availability cluster such that, if the primary node fails or experiences a fault that causes a failover from the primary node to the secondary node, the secondary node may take over as the primary node of the high-availability cluster with little to no interruption of the stateful user sessions.

In some implementations, as part of the synchronization process, cluster node 1 and cluster node 2 may jointly configure an ingress point and an egress point for the high-availability cluster. The ingress point may be the cluster node where network traffic enters the high-availability cluster from one or more external networks (e.g., the Internet, a public telecommunications network, a provider network, and/or the like). In other words, network traffic that is destined for a client device communicatively connected with the high-availability cluster enters the high-availability cluster via the ingress point. The egress point may be the cluster node where network traffic exits the high-availability cluster to the one or more external networks. In other words, network traffic that is originated for a client device communicatively connected with the high-availability cluster exits the high-availability cluster via the ingress point.

In some implementations, cluster node 1 and cluster node 2 may configure the ingress point and the egress point such that the ingress point and the egress point are located on the same cluster node, which may be referred to as an active/passive configuration. In some implementations, cluster node 1 and cluster node 2 may configure the ingress point and the egress point such that the ingress point and the egress point are located on different cluster nodes (e.g., the ingress point may be located on cluster node 1 and the egress point may be located on cluster node 2), which may be referred to as an active/active configuration. In some implementations, cluster node 1 and cluster node 2 may configure the ingress point and the egress point such that, if a cluster node (e.g., cluster node 1) that is serving as the ingress point and/or the egress point for the high-availability cluster fails and/or experiences a fault that causes a failover, the other cluster node (e.g., cluster node 2) may become the ingress point and/or the egress point.

Figure 1E:
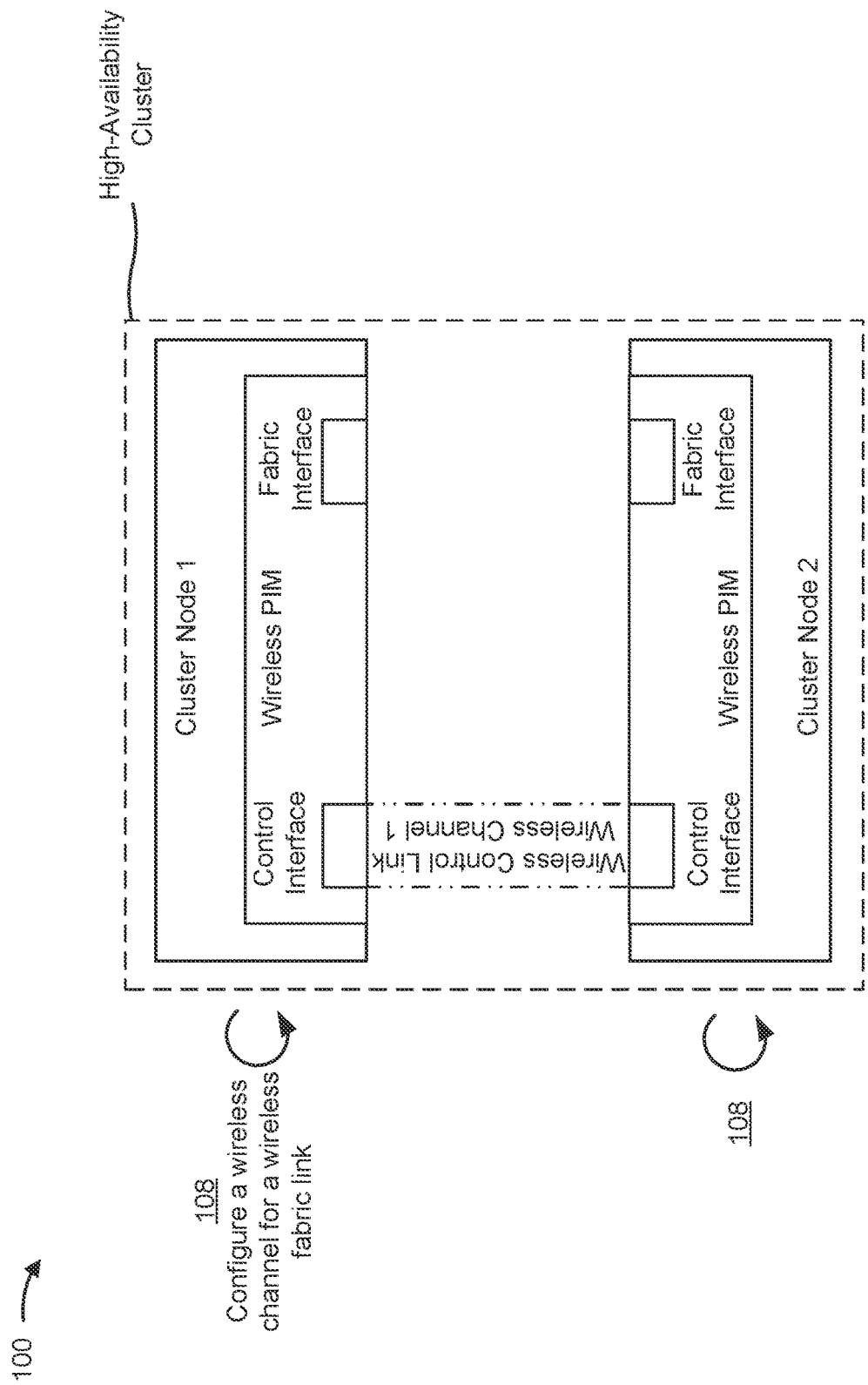

As shown in FIG. 1E, and by reference number 108, cluster node 1 and cluster node 2 may configure a wireless channel for a wireless fabric link between cluster node 1 and cluster node 2. In some implementations, cluster node 1 and cluster node 2 may automatically and jointly configure the wireless channel for the wireless fabric link between cluster node 1 and cluster node 2. In some implementations, cluster node 1 and cluster node 2 may automatically and jointly configure the wireless channel for the wireless fabric link based on establishing the wireless control link. In some implementations, cluster node 1 and cluster node 2 may configure the wireless channel for a wireless fabric link based on receiving an instruction, which may be provided as input (e.g., by a user via a console port and/or another means for input).

To automatically and jointly configure the wireless channel for the wireless fabric link, cluster node 1 and cluster node 2 may jointly configure the wireless channel such that the respective wireless fabric interfaces of cluster node 1 and cluster node 2 are operating on the same wireless channel. Moreover, cluster node 1 and cluster node 2 may jointly configure the wireless channel such that the wireless channel for the wireless fabric link and the wireless channel for the wireless control link are different wireless channels, are non-overlapping wireless channels, and/or the like.

Figure 1F:
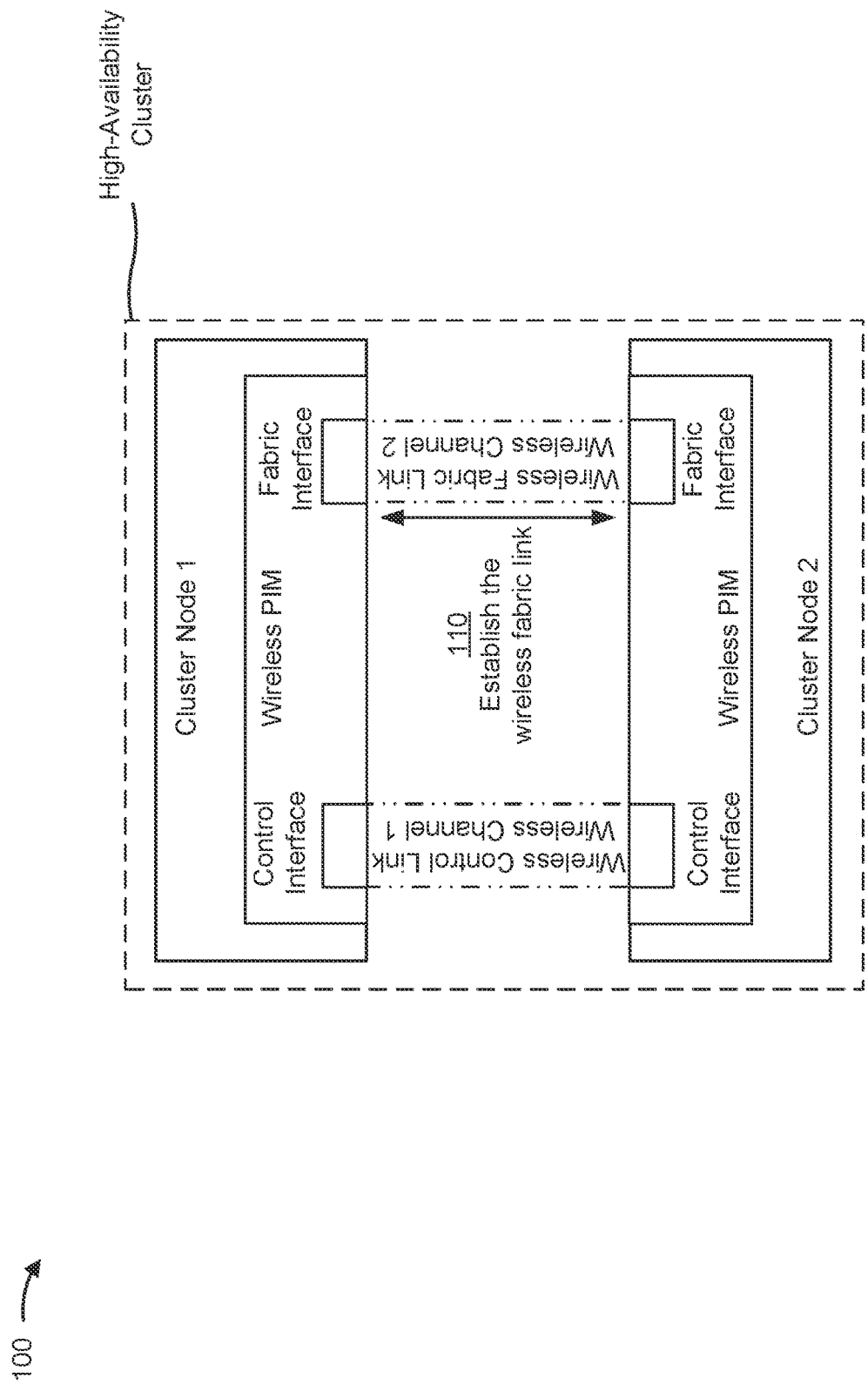

As shown in FIG. 1F, and by reference number 110, cluster node 1 and cluster node 2 may establish the wireless fabric link over the wireless channel (e.g., wireless channel 2) configured for the wireless fabric link. To establish the wireless fabric link, cluster node 1 and cluster node 2 may perform a handshake process and/or another type of wireless connection establishment process. The handshake process may include a four-way handshake process (e.g., a four-way handshake according to IEEE 802.11i) and/or another type of handshake process. Moreover, to increase the network security over the wireless fabric link, cluster node 1 and cluster node 2 may establish a tunnel over the wireless fabric link such that network traffic may be securely transmitted via the wireless fabric link. The tunnel may include an IPSec tunnel and/or another type of tunnel in which packets of the fabric traffic are encrypted, authenticated, and/or encapsulated.

Once cluster node 1 and cluster node 2 have completed the configuration process of the high-availability cluster, cluster node 2 and cluster node 2 may continue to exchange control traffic via the wireless control link (e.g., cluster node 1 may transmit control traffic to cluster node 2 via the wireless control link and/or cluster node 2 may transmit control traffic to cluster node 1 via the wireless control link), may transmit and/or forward network traffic via the wireless fabric link (e.g., cluster node 1 may transmit and/or forward network traffic to cluster node 2 via the wireless fabric link and/or cluster node 2 may transmit and/or forward network traffic to cluster node 1 via the wireless fabric link), and/or the like. In some implementations, cluster node 1 and/or cluster node 2 may perform the actions described above in reference to reference numbers 102-110 (or a subset thereof) to establish control links and/or fabric links with other cluster nodes in the high-availability cluster.

In this way, a network device (e.g., a high-availability cluster node) may include a wireless PIM, a wireless NIC, a wireless communication adapter, and/or another type of component that provides wireless communication capabilities. The network device may communicatively connect a wireless control interface with a wireless control interface of another network device (or a plurality of other devices) in a high-availability cluster to establish a wireless control link, by which control traffic may be exchanged. Moreover, the network device may communicatively connect a wireless fabric interface with a wireless fabric interface of the other network device to establish a wireless fabric link, by which network traffic may be exchanged. In this way, the network devices in the high-availability cluster may be connected wirelessly, which decreases the cost and complexity of deploying the high-availability cluster. Moreover, the flexibility of deploying the high-availability cluster is increased in that the physical location of the network devices is not restricted due to running physical network cables. Accordingly, the network devices may be more optimally placed (e.g., in an office building, across a campus, and/or the like) such that the wireless coverage of the high-availability cluster, for client devices that communicatively connect with the high-availability cluster, may be increased.

As indicated above, FIGS. 1A-1F are provided merely as one or more examples. Other examples may differ from what is described with regard to FIGS. 1A-1F.

Figure 2:
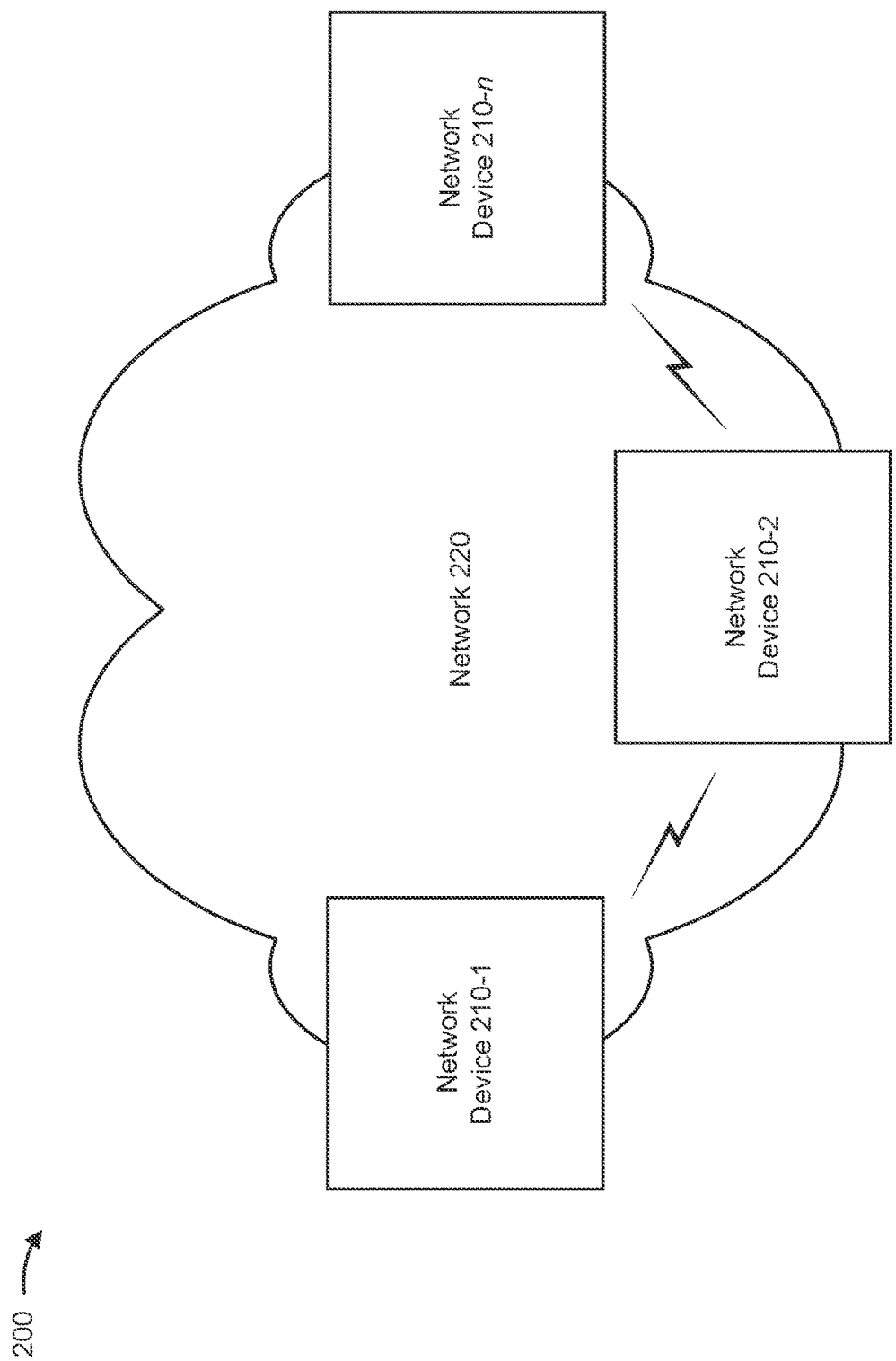
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more network devices 210-1 through 210-n (n≥1) (hereinafter referred to collectively as "network devices 210," and individually as "network device 210") and a network 220. Devices of environment 200 may interconnect via wired connections, wireless connections, or a combination of wired and wireless connections. In some implementations, network devices 210 may be linked and/or connected together to form a high-availability cluster. In some implementations, the high-availability cluster may include a plurality of nodes (e.g., two or more nodes) that are implemented by network devices 210.

Network device 210 includes one or more devices capable of receiving, providing, storing, generating, and/or processing information. In some implementations, network device 210 may include a firewall, a router, a gateway, a switch, a bridge, a wireless access point, a base station (e.g., eNodeB, NodeB, gNodeB, and/or the like), and/or the like. In some implementations, network device 210 may be implemented as a physical device implemented within a housing, such as a chassis. In some implementations, network device 210 may be implemented as a virtual device implemented by one or more computer devices of a cloud computing environment or a data center.

In some implementations, network device 210 may include a wireless PIM, a wireless NIC, a wireless communication adapter, and/or another type of component that provides wireless communication capabilities. Network device 210 may communicatively connect a wireless control interface with a wireless control interface of another network device 210 in a high-availability cluster to establish a wireless control link, by which control traffic may be exchanged. Moreover, network device 210 may communicatively connect a wireless fabric interface with a wireless fabric interface of the other network device 210 to establish a wireless fabric link, by which network traffic may be exchanged.

Network 220 includes one or more wireless networks. For example, network 220 may include a cellular network (e.g., a long-term evolution (LTE) network, a code division multiple access (CDMA) network, a 3G network, a 4G network, a 5G network, another type of cellular network, etc.), a wireless local area network (WLAN) (e.g., a Wi-Fi network, an unlicensed spectrum wireless network, and/or the like), a wireless peer-to-peer (P2P) network (e.g., Wi-Fi direct, Bluetooth, and/or the like), and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
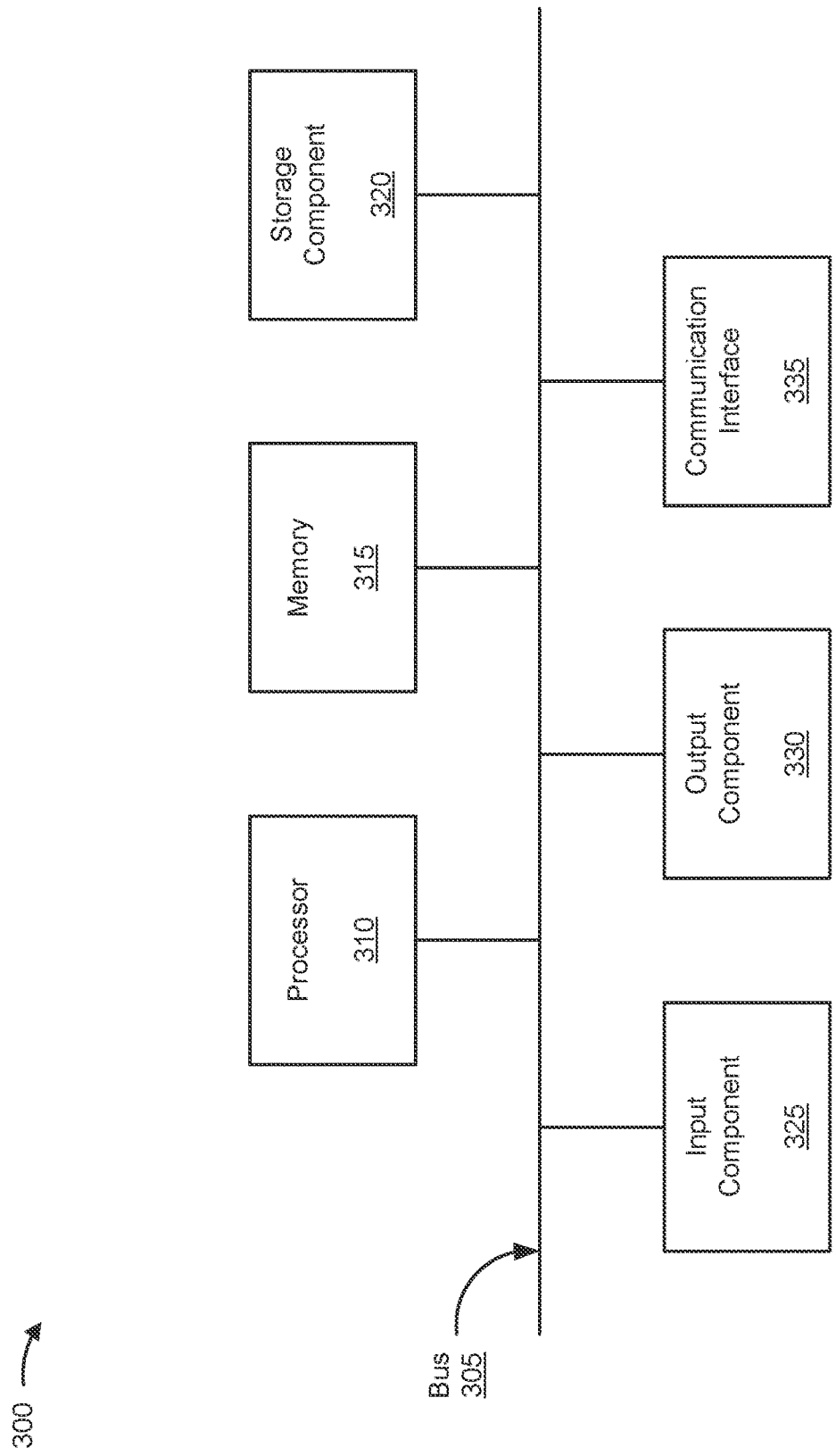
FIGS. 3A and 3B are diagrams of example components of one or more devices of FIG. 2.
Figure 3B:
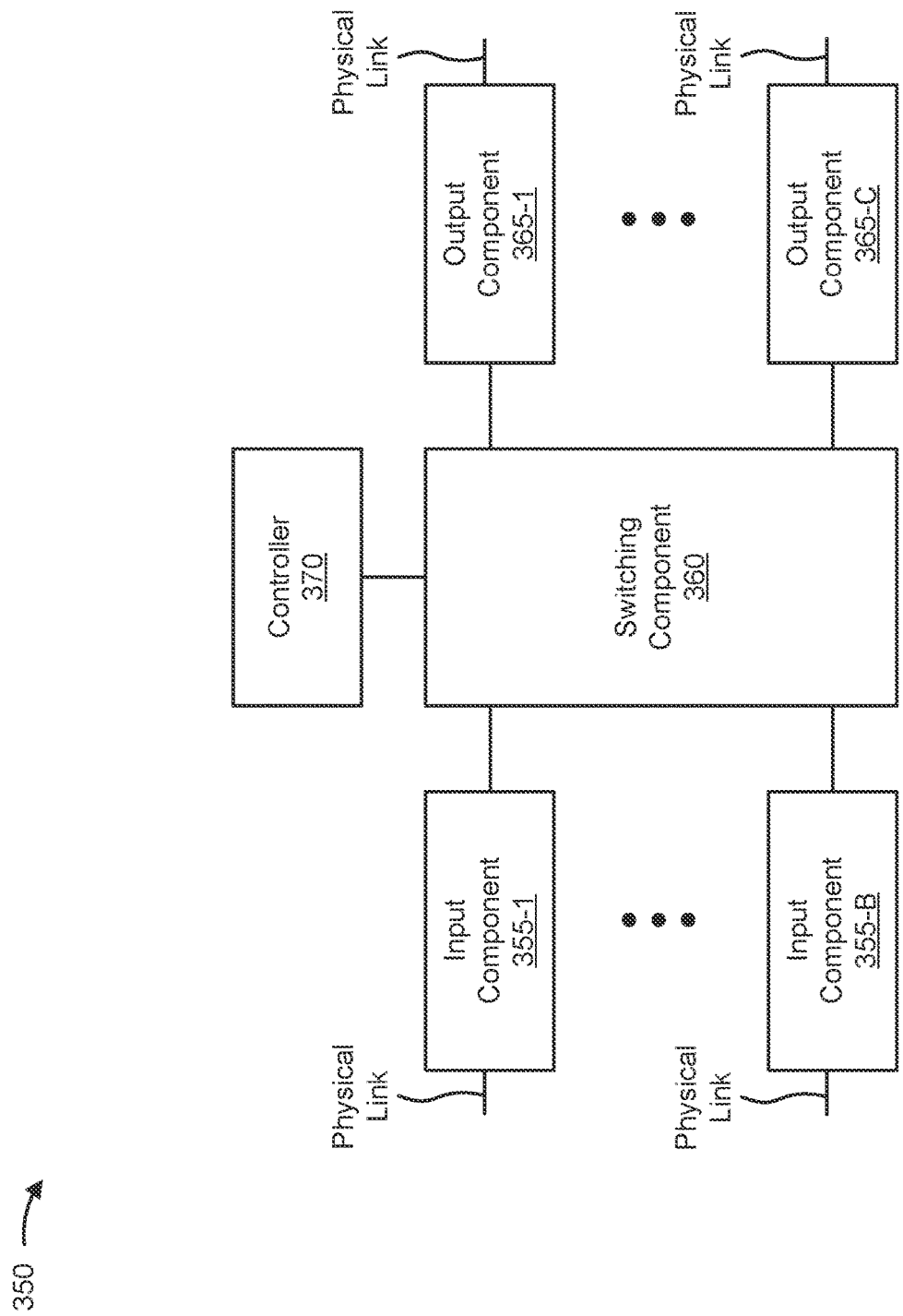

FIGS. 3A and 3B are diagrams of example components of one or more devices of FIG. 2. FIG. 3A is a diagram of example components of a device 300. In some implementations, device 300 may correspond to device 210. In some implementations, device 210 may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, an universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

FIG. 3B is a diagram of example components of a device 350. In some implementations, device 350 may correspond to device 210. In some implementations, device 210 may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C (C≥1) (hereinafter referred to collectively as output components 365, and individually as output component 365), and a controller 370.

Input component 355 may be points of attachment for physical links and may be points of entry for incoming traffic, such as packets. Input component 355 may process incoming traffic, such as by performing data link layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

FIG. 4 is a flow chart of an example process 400 for configuring wireless control and fabric links for high-availability cluster nodes. In some implementations, one or more process blocks of FIG. 4 may be performed by a first network device included in a high-availability cluster (e.g., network device 210, device 300, device 350, and/or the like). In some implementations, one or more process blocks of FIG. 4 may be performed by another device or a group of devices separate from or including the first network device, such as one or more other network devices and/or the like. In some implementations, the high-availability cluster may include a plurality of nodes (e.g., two or more nodes).

As shown in FIG. 4, process 400 may include configuring a first wireless channel for a wireless control link (block 410). For example, the network device (e.g., using processor 310, memory 315, storage component 320, input component 325, output component 330, communication interface 335, input component 355, switching component 360, output component 365, controller 370, and/or the like) may configure a first wireless channel for a wireless control link, as described above.

As further shown in FIG. 4, process 400 may include establishing, using the first wireless channel, the wireless control link with a second network device in the high-availability cluster (block 420). For example, the network device (e.g., using processor 310, memory 315, storage component 320, input component 325, output component 330, communication interface 335, input component 355, switching component 360, output component 365, controller 370, and/or the like) may establish, using the first wireless channel, the wireless control link with a second network device in the high-availability cluster, as described above.

As further shown in FIG. 4, process 400 may include configuring a second wireless channel for a wireless fabric link (block 430). For example, the network device (e.g., using processor 310, memory 315, storage component 320, input component 325, output component 330, communication interface 335, input component 355, switching component 360, output component 365, controller 370, and/or the like) may configure a second wireless channel for a wireless fabric link, as described above.

As further shown in FIG. 4, process 400 may include establishing, using the second wireless channel, the wireless fabric link with the second network device (block 440). For example, the network device (e.g., using processor 310, memory 315, storage component 320, input component 325, output component 330, communication interface 335, input component 355, switching component 360, output component 365, controller 370, and/or the like) may establish, using the second wireless channel, the wireless fabric link with the second network device, as described above.

Process 400 may include additional implementations, such as any single implementation or any combination of implementations described below and/or in connection with one or more other processes described elsewhere herein.

In a first implementation, configuring the second wireless channel comprises configuring the second wireless channel based on establishing the wireless control link. In a second implementation, alone or in combination with the first implementation, process 400 further comprises synchronizing, based on establishing the wireless control link, a routing engine of the first network device and a routing engine of the second network device via the wireless control link. In a third implementation, alone or in combination with one or more of the first and second implementations, synchronizing the routing engine of the first network device and the routing engine of the second network device comprises at least one of transmitting one or more heartbeat packets to the second network device via the wireless control link, transmitting information identifying a routing table to the second network device via the wireless control link, or, transmitting routing protocol traffic to the second network device via the wireless control link.

In a fourth implementation, alone or in combination with one or more of the first through third implementations, process 400 further comprises causing the first network device to reboot based on configuring the first wireless channel, and establishing the wireless control link with the second network device comprises establishing the wireless control link with the second network device after causing the first network device to reboot. In a fifth implementation, alone or in combination with one or more of the first through fourth implementations, process 400 further comprising configuring the first network device with a cluster identifier associated with the high-availability cluster and a node identifier associated with the first network device. In a sixth implementation, alone or in combination with one or more of the first through fifth implementations, process 400 further comprises jointly establishing, with the second network device and via the wireless control link, a primary node for the high-availability cluster and a secondary node for the high-availability cluster.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for configuring wireless control and fabric links for high-availability cluster nodes. In some implementations, one or more process blocks of FIG. 5 may be performed by a first network device (e.g., network device 210, device 300, device 350, and/or the like). In some implementations, one or more process blocks of FIG. 5 may be performed by another device or a group of devices separate from or including the first network device, such as one or more other network devices and/or the like.

As shown in FIG. 5, process 500 may include configuring a first wireless channel for a wireless control link, wherein the first network device is included in a high-availability cluster (block 510). For example, the network device (e.g., using processor 310, memory 315, storage component 320, input component 325, output component 330, communication interface 335, input component 355, switching component 360, output component 365, controller 370, and/or the like) may configure a first wireless channel for a wireless control link, as described above. In some implementations, the first network device is included in a high-availability cluster.

As further shown in FIG. 5, process 500 may include establishing, using the first wireless channel, the wireless control link with a second network device in the high-availability cluster (block 520). For example, the network device (e.g., using processor 310, memory 315, storage component 320, input component 325, output component 330, communication interface 335, input component 355, switching component 360, output component 365, controller 370, and/or the like) may establish, using the first wireless channel, the wireless control link with a second network device in the high-availability cluster, as described above.

As further shown in FIG. 5, process 500 may include synchronizing, via the wireless control link, a routing engine of the first network device and a routing engine of the second network device (block 530). For example, the network device (e.g., using processor 310, memory 315, storage component 320, input component 325, output component 330, communication interface 335, input component 355, switching component 360, output component 365, controller 370, and/or the like) may synchronize, via the wireless control link, a routing engine of the first network device and a routing engine of the second network device, as described above.

As further shown in FIG. 5, process 500 may include configuring a second wireless channel for a wireless fabric link, wherein the first wireless channel and the second wireless channel are different wireless channels (block 540). For example, the network device (e.g., using processor 310, memory 315, storage component 320, input component 325, output component 330, communication interface 335, input component 355, switching component 360, output component 365, controller 370, and/or the like) may configure a second wireless channel for a wireless fabric link, as described above. In some implementations, the first wireless channel and the second wireless channel are different wireless channels.

As further shown in FIG. 5, process 500 may include establishing, using the second wireless channel, the wireless fabric link with the second network device (block 550). For example, the network device (e.g., using processor 310, memory 315, storage component 320, input component 325, output component 330, communication interface 335, input component 355, switching component 360, output component 365, controller 370, and/or the like) may establish, using the second wireless channel, the wireless fabric link with the second network device, as described above.

Process 500 may include additional implementations, such as any single implementation or any combination of implementations described below and/or in connection with one or more other processes described elsewhere herein.

In a first implementation, process 500 further comprises transmitting control traffic to the second network device via the wireless control link and transmitting network traffic to the second network device via the wireless fabric link. In a second implementation, alone or in combination with the first implementation, the control traffic comprises at least one of heartbeat packets, information identifying a routing table, or routing protocol traffic. In a third implementation, alone or in combination with one or more of the first and second implementations, the first wireless channel and the second wireless channel are non-overlapping wireless channels. In a fourth implementation, alone or in combination with one or more of the first through third implementations, the first wireless channel, the second wireless channel, and one or more third wireless channels that are used for wireless communication links between the first network device and one or more client devices are different wireless channels.

In a fifth implementation, alone or in combination with one or more of the first through fourth implementations, establishing the wireless control link comprises establishing a first IPSec tunnel associated with the wireless control link, and establishing the wireless fabric link comprises establishing a second IPSec tunnel associated with the wireless fabric link. In a sixth implementation, alone or in combination with one or more of the first through fifth implementations, the wireless control link is associated with a control interface of a wireless PIM included in the first network device and the wireless fabric link is associated with a fabric interface of the wireless PIM.

In a seventh implementation, alone or in combination with one or more of the first through sixth implementations, the first network device is configured as an ingress point and an egress point for the high-availability cluster, the second network device is configured to become the ingress point for the high-availability cluster if a failure associated with an ingress interface of the first network device occurs, and the second network device is configured to become the egress point for the high-availability cluster if a failure associated with an egress interface of the first network device occurs.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, the term "component" is intended to be broadly construed as hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    establishing, by a first network device, a first wireless link with a second network device,
        wherein the first network device and the second network device are in a cluster of three or more network devices;
    communicating, by the first network device and via the first wireless link, control traffic to form at least one of:
        a unified control plane based on synchronizing a configuration and kernel state of control planes of the three or more network devices in the cluster, or
        a unified routing engine for the cluster based on synchronizing a configuration and kernel state of routing engines of the three or more network devices in the cluster; and
    establishing, by the first network device, a second wireless link with the second network device,
        wherein the second wireless link is used to forward network traffic.

2. The method of claim 1, further comprising:
    configuring, by the first network device, a cluster identifier associated with the cluster; and
    wherein establishing the first wireless link with the second network device comprises:
        broadcasting information that indicates the cluster identifier of the first network device;
        scanning for a particular network device that is configured with the same cluster identifier,
            wherein the particular network device is the second network device; and
        establishing, based on scanning for the particular network device that is configured with the same cluster identifier, the first wireless link with the second network device.

3. The method of claim 1, wherein the second wireless link is established based on establishing the first wireless link.

4. The method of claim 1, wherein the first wireless link is a wireless control link established over a control interface of the first network device, and
    wherein the second wireless link is a wireless fabric link established over a fabric interface of the first network device.

5. The method of claim 1, wherein the first wireless link is established over a first wireless channel, and
    the second wireless link is established over a second wireless channel.

6. The method of claim 1, further comprising:
    establishing a primary node and a secondary node of the cluster,
        wherein the primary node hosts user sessions and a primary routing engine session of the cluster, and
        wherein the secondary node hosts backup information for the user sessions and a routing engine session of the cluster; and
    performing failover from the primary node to the secondary node when the primary node experiences a fault, wherein the secondary node takes over as the primary node of the cluster based on performing the failover.

7. The method of claim 1, wherein the second wireless link is used to form at least one of:
a unified data plane for the cluster, or
a unified forwarding engine for the cluster.

8. The method of claim 1, further comprising:
configuring the first network device as an ingress point and an egress point for the cluster;
configuring the second network device as the ingress point for the cluster when a failure associated with an ingress interface of the first network device occurs; and
configuring the second network device as the egress point for the cluster when a failure associated with an egress interface of the first network device occurs.

9. A first network device, comprising:
one or more memories; and
one or more processors, coupled to the one or more memories, to:
establish a first wireless link with a second network device,
wherein the first network device and the second network device are in a cluster of three or more network devices;
communicate, via the first wireless link, control traffic to form at least one of:
a unified control plane based on synchronizing a configuration and kernel state of control planes of the three or more network devices in the cluster, or
a unified routing engine for the cluster based on synchronizing a configuration and kernel state of routing engines of the three or more network devices in the cluster; and
establish a second wireless link with the second network device,
wherein the second wireless link is used to forward network traffic.

10. The first network device of claim 9, wherein the one or more processors are further to:
configure a cluster identifier associated with the cluster; and
wherein the one or more processors, to establish the first wireless link with the second network device, are configured to:
broadcast information that indicates the cluster identifier;
scan for a particular network device that is configured with the same cluster identifier,
wherein the particular network device is the second network device; and
establishing, based on scanning for the particular network device that is configured with the same cluster identifier, the first wireless link with the second network device.

11. The first network device of claim 9, wherein the second wireless link is established based on establishing the first wireless link.

12. The first network device of claim 9, wherein the first wireless link is a wireless control link established over a control interface of the first network device, and
wherein the second wireless link is a wireless fabric link established over a fabric interface of the first network device.

13. The first network device of claim 9, wherein the one or more processors are further to:
establish a primary node and a secondary node of the cluster,
wherein the primary node hosts user sessions and a primary routing engine session of the cluster, and
wherein the secondary node hosts backup information for the user sessions and a routing engine session of the cluster; and
perform failover from the primary node to the secondary node when the primary node experiences a fault,
wherein the secondary node takes over as the primary node of the cluster based on performing the failover.

14. The first network device of claim 9, wherein the second wireless link is used to form at least one of:
a unified data plane for the cluster, or
a unified forwarding engine for the cluster.

15. The first network device of claim 9, wherein the one or more processors are further to:
configure the first network device as an ingress point and an egress point for the cluster;
configure the second network device as the ingress point for the cluster when a failure associated with an ingress interface of the first network device occurs; and
configure the second network device as the egress point for the cluster when a failure associated with an egress interface of the first network device occurs.

16. A non-transitory computer-readable medium storing a set of instructions, the set of instructions comprising:
one or more instructions that, when executed by one or more processors of a first network device, cause the first network device to:
establish a first wireless link with a second network device,
wherein the first network device and the second network device are in a cluster of three or more network devices;
communicate, via the first wireless link, control traffic to form at least one of:
a unified control plane based on synchronizing a configuration and kernel state of control planes of the three or more network devices in the cluster, or
a unified routing engine for the cluster based on synchronizing a configuration and kernel state of routing engines of the three or more network devices in the cluster; and
establish a second wireless link with the second network device,
wherein the second wireless link is used to forward network traffic.

17. The non-transitory computer-readable medium of claim 16, wherein the one or more instructions, when executed by one or more processors of a first network device, further cause the first network device to:
configure a cluster identifier associated with the cluster; and
wherein the one or more instructions, that cause the first network device to establish the first wireless link with the second network device, cause the first network device to:
broadcast information that indicates the cluster identifier;
scan for a particular network device that is configured with the same cluster identifier,
wherein the particular network device is the second network device; and
establish, based on scanning for the particular network device that is configured with the same cluster identifier, the first wireless link with the second network device.

18. The non-transitory computer-readable medium of claim 16, wherein the first wireless link is a wireless control link established over a control interface of the first network device, and
    wherein the second wireless link is a wireless fabric link established over a fabric interface of the first network device.

19. The non-transitory computer-readable medium of claim 16, wherein the one or more instructions further cause the first network device to:
    establish a primary node and a secondary node of the cluster,
        wherein the primary node hosts user sessions and a primary routing engine session of the cluster, and
        wherein the secondary node hosts backup information for the user sessions and a routing engine session of the cluster; and
    perform failover from the primary node to the secondary node when the primary node experiences a fault,
        wherein the secondary node takes over as the primary node of the cluster based on performing the failover.

20. The non-transitory computer-readable medium of claim 16, wherein the one or more instructions further cause the first network device to:
    configure the first network device as an ingress point and an egress point for the cluster;
    configure the second network device as the ingress point for the cluster when a failure associated with an ingress interface of the first network device occurs; and
    configure the second network device as the egress point for the cluster when a failure associated with an egress interface of the first network device occurs.

\* \* \* \* \*